United States Patent [19]

Korpela

[11] 3,830,604
[45] Aug. 20, 1974

[54] APPARATUS FOR PRODUCING CONTINUOUS STRANDS OF THERMOPLASTIC MATERIAL

[75] Inventor: Heikki Korpela, Katrineholm, Sweden

[73] Assignee: Gullifiber, A. B., Billesholm, Sweden

[22] Filed: Nov. 15, 1972

[21] Appl. No.: 306,857

[30] Foreign Application Priority Data
Dec. 7, 1971 Sweden.............................. 15501/71

[52] U.S. Cl.................... 425/4 C, 264/47, 425/371, 425/817
[51] Int. Cl............................................ B29d 27/00
[58] Field of Search..... 264/47, 51; 425/4 C, 817 C, 425/371, 335; 164/278, 86

[56] References Cited
UNITED STATES PATENTS
3,383,441   5/1968   Norrhede et al................ 425/4 C X
3,594,461   7/1971   Jacob............................. 425/4 C X
3,736,082   5/1973   Wick et al. ..................... 425/371 X Primary Examiner—R. Spencer Annear
Assistant Examiner—Mark Rosenbaum

[57] ABSTRACT

A machine for continuous production of a strand of porous thermoplastic material from expandable, pre-expanded granules of said material by additional expansion and agglutination in a channel open at both ends and defined between opposed horizontal portions of two endless belts movable along closed paths under the action of heat from separate heating boxes adjacent said belt portions. To vary the height of the channel and therewith that of the strand advanced therethrough, the spacing between the opposed defining belt portions is variable. For rendering possible any desired variation of said spacing with as short break of operation as possible, the heating boxes project outside the belt portions and are here sealed from one another and from the sides of the channel between the belt portions by primary beams rigidly secured to the heating boxes and secondary beams exchangeably interposed between the primary beams. The secondary beams have varying height dimensions preferably according to a predetermined module permitting to assemble them to any desired height of the channel. The assembled beams form an interior face in the same vertical plane and their interior surfaces are preferably covered with a layer of friction reducing material.

2 Claims, 2 Drawing Figures

APPARATUS FOR PRODUCING CONTINUOUS STRANDS OF THERMOPLASTIC MATERIAL

FIELD OF THE INVENTION

This invention relates to a machine for producing a body of porous thermoplastic material.

More particularly, this invention relates to a machine for producing a body of porous thermoplastic material in the shape of a continuously advancing strand from expandable granules of said material, said machine comprising an elongated channel open at both ends and bounded on two opposed sides by one horizontal portion each of two endless, preferably perforated, belts movable along closed paths, one portion of said channel above and below, respectively, said belt portions being adjacent to two separate boxes for a heating fluid, preferably steam, said belt portions being adjustable relative to one another for variation of the height of the channel and therewith the thickness of the strand produced within the same.

THE PRIOR ART

For several reasons it is desirable to give the strand of the porous thermoplastic material directly that thickness which the finished slab of cellular plastic material is to have instead of severing a larger block into slabs. For this purpose it is known to make the channel adjustable in height in correspondence to the dimension in each individual case desired by the purchaser. Readjustment of the apparatus from one channel height to the next one results in frequent interrruptions of operation which hitherto involved a considerable reduction of the capacity of the apparatus.

OBJECTS OF THE INVENTION

One main object of the invention is to provide a device which permits readjustment of the machine for production of slabs of cellular plastic material of every desired, varying thickness with a minimum of loss of time so that the apparatus can be utilized during the major part of the working time at disposal and therewith the production reaches a maximum value.

MAIN FEATURES OF THE INVENTION

According to a main feature of the invention the aforementioned object of the invention and other objects which will become evident hereinafter are obtained substantially by having the heating boxes project laterally outside the belt portions and being sealed from one another and from the longitudinally extending sides of the channel by means of, firstly, primary beams connected with the heating boxes and, secondly, secondary beams loosely provided therebetween and exchangeable so as to provide the desired height of the channel. The channel has a length which may reach and even exceed 10 meters and, nevertheless, the exchange of the correspondingly long secondary beams for adaption to another thickness of the strand of cellular plastic material can be performed rapidly after the belts have been moved apart.

THE DRAWINGS

Further objects and advantages of the invention will become apparent from the following description, considered in connection with the accompanying drawings, which form part of this specification, and of which:

DETAILED DESCRIPTION OF A PREFERRED EMBODIMENT

Figure 1:
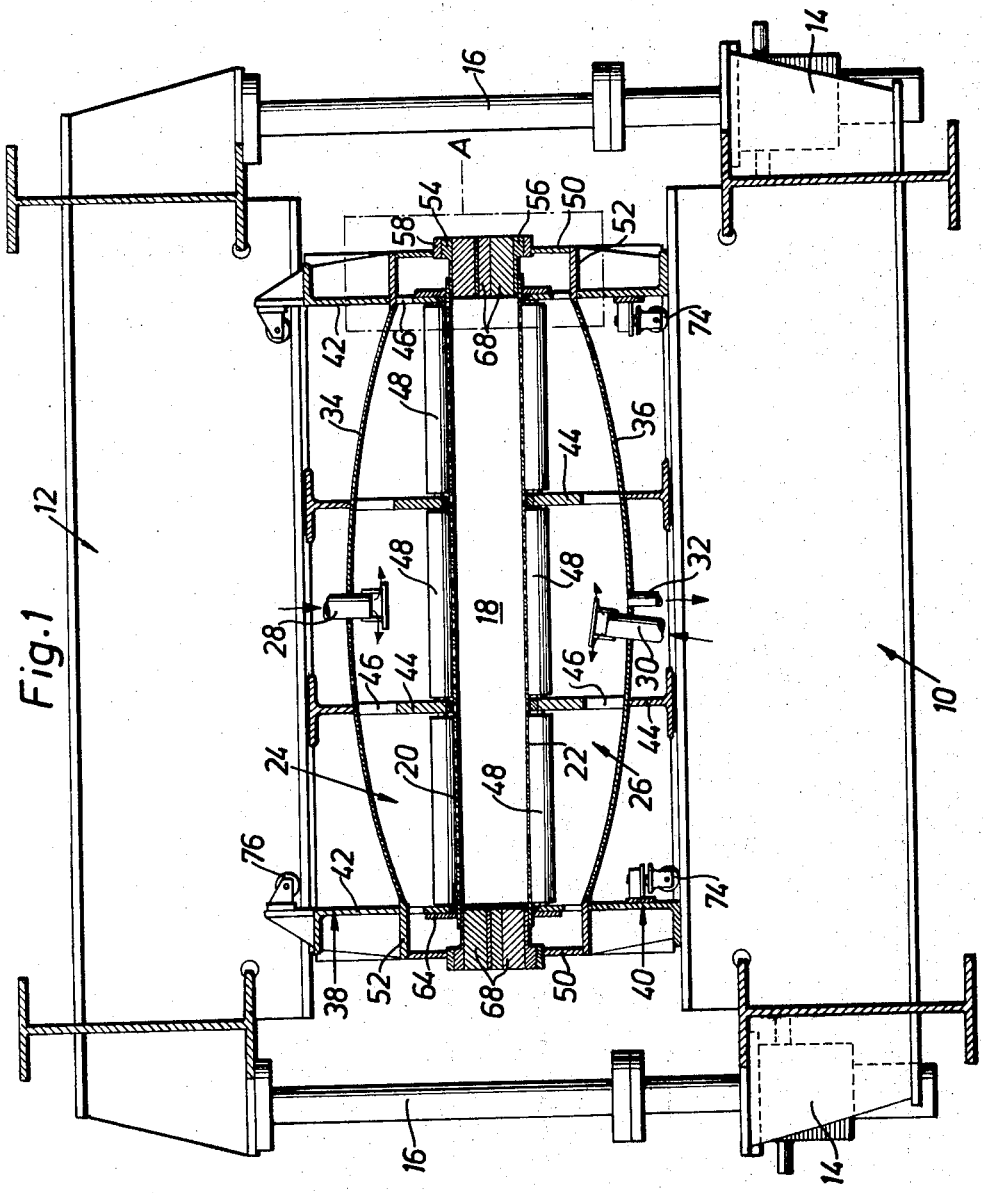
FIG. 1 is a diagrammatic vertical cross-sectional view of parts of an apparatus constructed according to one embodiment of the invention.

Referring now to the drawings, reference numeral 10 generally denotes a lower frame portion and 12 an upper frame portion which portions are adapted to be lifted and lowered relatively one another by means of a plurality of lifting jacks 14, from which columns 16 project upwards to the upper frame portion. A channel 18 is defined at the top and the bottom by one plane reach of two endless perforated steel belts which at both ends of the apparatus are positioned to run over horizontally mounted turning drums (not shown). In the figures there is shown the lower reach 20 of the upper belt and the upper reach 22 of the lower belt, which portions thus determine or define the height of the channel 18. The other two horizontal reaches of the belts are not shown in the drawings. The belts are driven synchronously by turning drums, their portions 20, 22 thus moving along horizontal paths transversely to the drawing plane. The starting material, which preferably consists of preexpanded grains or granules of thermoplastic material, is introduced through one short end of the elongated rectangular channel, within which continuous expansion, under agglutination, of the granules to a coherent strand is effected. For nearer description of a continuously operating machine for cellular plastic materials of the type under consideration reference is made for example to the U.S. Pat. specification No. 1,165,798.

After the preexpanded granules have been introduced into the channel 18 at one end of the elongated apparatus continuing expansion is effected by supply of a heating fluid, preferably steam, to the body of granules. For this purpose there is provided in a first zone of the apparatus an upper steam box 24 and a lower steam box 26 which are insulated from the surrounding atmosphere and separated from one another, but communicate with the channel 18 through perforations in the belt portions 20, 22. The upper steam box 24 is supplied with steam through a pipe 28 and the lower steam box 26 through a pipe 30. During the heating of the body of granules condensate is produced which is discharged from the lower steam box through a conduit 32. Preferably, the steam boxes have curved walls 34 and 36, respectively, in order to be capable of easier taking up the superatmospheric pressure of the steam which can reach about 1 atmosphere above atmospheric pressure. The two steam boxes are supported by upper and lower supports, generally denoted 38 and 40, respectively, which supports comprise laterally extending side walls 42 and partition walls 44 extending parallel therewith. These partition walls are formed with openings 46 to allow passage of steam to the various compartments and discharge of condensate from the lower steam box.

By the expansion of the thermoplastic granules a considerable positive pressure is produced which is taken up over the belt portions 20, 22 by rollers 48 mounted in the supports 38 and 40, respectively. In the illustrated embodiments three rows of such rollers 48 are disposed transversely of the belts. The rollers in the individual rows are thus provided in parallel mutual relationship with a suitable spacing from one another and their ends are mounted rotatably in the side walls 42 and the partition walls 44, respectively.

Figure 2:
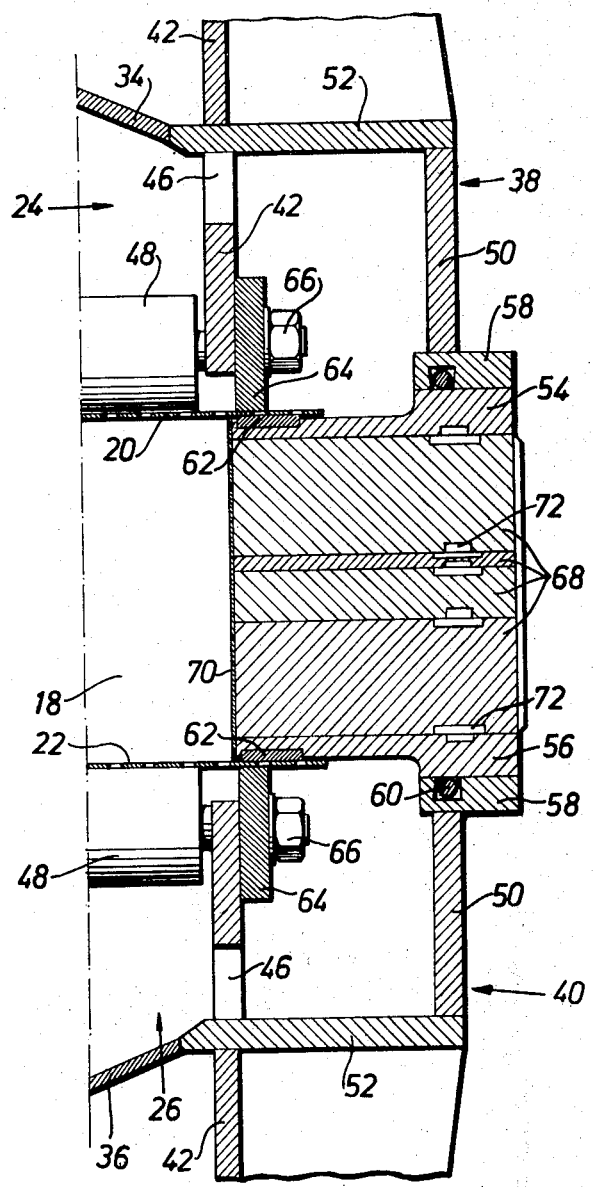
FIG. 2 shows the portion contained in the rectangle A of FIG. 1 in the same section but on a larger scale.

In the lateral direction the steam boxes 24, 26 are broader than the belt portions 20, 22 and they are delimited in the lateral direction by wall portions 50, 52 which constitute prolongations of the side walls 42. The channel 18 is delimited in lateral direction by packs of primary beams and secondary beams made in accordance with the invention and extending from the wall portion 50 inwards for some distance past the lateral edges of the belt portions. These beams consist of, as is especially evident from FIG. 2, firstly, an upper and a lower primary beam 54 and 56, respectively, which beams are rigidly secured onto the associated wall portions or flanges 58 connected with said wall portions, e.g. by means of bolts (not shown). If desired, sealings 60 may be interposed between said parts. The connection between the primary beam 54 or 56 and the associated support 38 or 40, respectively, is thus intended to be permanent so that it also is maintained when the belt portions 20, 22 are adjusted to some new spacing between them, which spacing defines an adjusted height of the channel 18.

The upper reaches of the belt portions 20, 22 adjacent their lateral edges bear against rims 62 which are fixed onto the primary beams 54 and 56, respectively. On the opposite external sides of the belt portions, i.e. inside the steam boxes, are sliding rims 64 standing edgewise and fixed on the side walls 42 e.g. by means of bolts 66. The sliding rims 62, 64 serve as guides for, and support to, the edges of the belts.

Provided between the primary beams 54, 56 is a number of secondary beams 68 made according to the invention to and assembled so as together with the thickness of the primary beams 54, 56 define a total height which is equal to the desired thickness of the strand of the porous plastic material continuously formed within the channel 18. In the embodiment illustrated in the drawings, four such secondary beams are inserted between the stationary primary beams 54, 56. The secondary beams 68, which in the same manner as the primary beams 54, 56 preferably are made of metal, have individually the same broad dimension but various heights according to some suitable module so that any desired thickness of the strand can be obtained. The individual beams may on their inwardly facing sides be covered with a layer 70 of Teflon (R) or some other material having a low friction coefficient with the strand of cellular plastic material advancing within the channel 18. To ensure the correct lateral position relative to one another of the beams 68 and relative to the stationary beams 54, 56 plates, washers, keys or the like means 72 are inserted into recesses or grooves formed in the beams. These washers or keys have also for their purpose to take up that lateral pressure which the expanding body of granules exerts on the beams 68. They can also serve as sealings to counteract leaking out of steam.

OPERATION OF THE DESCRIBED EMBODIMENT

When a readjustment of the apparatus for producing a strand of plastic material having some other thickness than that hitherto produced is desired, the upper frame part 12 of the apparatus is lifted by means of the jacks 14. One or several of the loose secondary beams 68 can now without difficulty be removed or replaced to compose a new set of beams resulting in the new desired height of the channel and thickness of the strand. After the upper part 12 has been lowered so that its weight is carried by the secondary beams 68 over the supports 38, 40, the apparatus can be restarted for operation. The secondary beams 68 ensure simultaneously, as they serve as spacers between the belt portions 20, 22, that leaking out of steam will not occur in the lateral direction and that the two steam boxes 24, 26 remain completely separated from one another. This feature is of importance because it permits different steam pressures to be maintained in the two steam boxes. The lifting jacks lock the part 12 in its lowered position against upward movement due to the pressure from the body of plastic material.

The two steam boxes may be drawn out in lateral direction for inspection or cleaning. For this purpose they are provided with rollers 74 and 76, respectively, which cooperate with horizontal plane tables in the lower and upper frame parts 10 and 12, respectively. Behind the steam boxes 24, 26 a cooling zone begins within which the expanded agglutinated mass of granules is cooled during its continued advance within the channel and is imparted its stable shape. This cooling zone is disclosed in the patent specification referred to above, but shall not be described here because it is outside the scope of the present invention. It will easily be understood that the channel 18 in the cooling zone also is adjusted to the same height dimension as in the heating zone which is effected with the same or a similar beam system as the system described hereinbefore.

While one more or less specific embodiment of the invention has been shown and described, it is to be understood that this is for purpose of illustration only, and that the invention is not to be limited thereby, but its scope is to be determined by the appended claims.

What is claimed is:

1. In apparatus for producing a strand of thermoplastic material from expandable granules of the material, having
an elongate channel open at both ends and bounded on its upper and lower sides by the lower and upper reaches, respectively, of two perforated endless belts,
separate steam boxes disposed, respectively, above and below said reaches adjacent thereto, and closed, at top and bottom by upper and lower walls, respectively, and on their lateral sides by side walls,
upper and lower frame portions on which the two steam boxes, respectively, are supported,
means for varying the height of said channel including means for adjusting said upper frame portion toward and away from said lower frame portion,
the improvement comprising arranging
said steam boxes so that each projects laterally beyond opposite lateral edges of the associated belt reach,
means for sealing the side walls of said steam boxes to the inside surfaces of the lower and upper reaches, respectively, of said belts,
primary beams rigidly secured to the sides of said upper and lower steam boxes, respectively, at opposite lateral sides thereof, and means on each of said primary beams engaging the opposite sides of each of said reaches adjacent the opposite lateral edges thereof, respectively, to guide and support said reaches, a plurality of secondary beams removably mounted between the primary beams at each side of the steam boxes, said secondary beams being interchangeable to vary the height of said channel, and said primary and secondary beams, when said upper and lower frame portions and said primary and secondary beams are in operative positions, bounding said channel laterally and forming the lateral sides thereof.

2. In apparatus as claimed in claim 1, means for guiding said secondary beams relative to one another and relative to said primary beams for insuring that the narrow sides of all said beams facing said channel at one lateral side thereof are all in the same plane.

* * * * *